(12) United States Patent
Wobben

(10) Patent No.: US 7,074,011 B1
(45) Date of Patent: Jul. 11, 2006

(54) WIND POWER INSTALLATION WITH TWO ROTORS IN TANDEM

(76) Inventor: Aloys Wobben, Argestrasse 19, Aurich D-26607, DE (US)

( * ) Notice: Subject to any disclaimer, the term of this patent is extended or adjusted under 35 U.S.C. 154(b) by 0 days.

(21) Appl. No.: 10/182,281

(22) PCT Filed: Nov. 14, 2000

(86) PCT No.: PCT/EP00/11218

§ 371 (c)(1),
(2), (4) Date: Oct. 7, 2002

(87) PCT Pub. No.: WO01/55590

PCT Pub. Date: Aug. 2, 2001

(30) Foreign Application Priority Data

Jan. 26, 2000 (DE) .......................... 100 03 385

(51) Int. Cl.
*F03D 1/02* (2006.01)

(52) U.S. Cl. .................. 416/126; 416/124; 416/201 R; 416/201 A; 415/4.3; 415/4.5; 415/68; 290/55

(58) Field of Classification Search .................. 415/4.3, 415/4.5, 66, 68, 69, 908; 416/124, 126, 198 R, 416/198 A, 201 R, 201 A; 290/44, 55
See application file for complete search history.

(56) References Cited

U.S. PATENT DOCUMENTS

| 1,498,978 | A | * | 6/1924 | Muntz | ........................ 416/85 |
| 1,804,016 | A | | 5/1931 | Koenig | |
| 2,177,801 | A | * | 10/1939 | Erren | .......................... 290/55 |
| 4,039,848 | A | | 8/1977 | Winderl | |
| 4,065,225 | A | | 12/1977 | Allison | |
| 4,217,501 | A | * | 8/1980 | Allison | ........................ 290/55 |
| 4,299,198 | A | * | 11/1981 | Woodhull | .................... 126/247 |
| 4,345,161 | A | | 8/1982 | Crompton | |
| 4,447,738 | A | * | 5/1984 | Allison | ........................ 290/44 |

FOREIGN PATENT DOCUMENTS

| DE | 746340 | 7/1944 | |
| DE | 25 47 503 A1 | 4/1977 | |
| DE | 29 32 293 A1 | 2/1981 | |
| DE | 30 18 802 A1 | 11/1981 | |
| DE | 31 17 996 A1 | 11/1982 | |
| DE | 44 44 757 A1 | 6/1996 | |
| FR | 627371 | 10/1927 | |
| GB | 758628 | 10/1956 | |
| JP | 56-138465 A * | 10/1981 | .................. 415/66 |
| WO | WO 96/00349 | 1/1996 | |

* cited by examiner

*Primary Examiner*—Christopher Verdier
(74) *Attorney, Agent, or Firm*—Seed IP Law Group PLLC

(57) ABSTRACT

A wind power installation comprising at least two rotors which are arranged one behind the other and of which the first rotor which is arranged in front of the second rotor is of a smaller diameter than the second rotor.

15 Claims, 2 Drawing Sheets

WIND POWER INSTALLATION WITH TWO ROTORS IN TANDEM

TECHNICAL FIELD

The invention concerns a wind power installation, in particular a large-scale wind power installation with an output power of more than two MW, preferably about five MW or more.

In accordance with the invention, for a large-scale wind power installation of that kind, there is proposed a rotor design and the configuration of corresponding rotor blades, so that reliable operation of such a wind power installation is possible.

BACKGROUND ART

It is already state of the art (Erich Hau, "Windkraftanlagen" ("Wind Power Installations"), 1996, 2nd edition, page 113 ff) for a rotor blade which is optimized for a maximum degree of efficiency to be provided in the inner region with very great blade depths. (See FIG. 1.) Such rotor blades are used for example by Enercon in the wind power installation of type E-40 (power range is between 500 and 600 KW). The inner region of a rotor blade is in that respect that portion which is close to the hub (rotor blade root) and accordingly involves a small radius.

While such a rotor blade which is optimised for a maximum degree of efficiency is good to produce for relatively small installations and can also be transported without any problem, such a rotor blade design suffers from two disadvantages. Firstly, the very large area of the rotor blade at the rotor blade root gives rise to very high loads when high wind speeds are involved. The wind power installation is usually then already shut down. However, the entire wind power installation has to be designed (dimensioned) for those very high loads. The second disadvantage lies in production of a rotor blade involving a very great blade depth. While that disadvantage is still scarcely significant in relation to rotor blades of a relatively small radius, manufacture and subsequent transportation of such a rotor blade which is of a very great length (for example more than 50 m) is highly complicated and in part impossible and the very great blade depth entails an extremely great increase in material and labour.

For those reasons the proposal has been made to circumvent the great blade depths. FIG. 2 shows a design configuration which was earlier frequently built in Denmark.

In this embodiment of a rotor blade, the inner region was completely eliminated. As the harvest area corresponds to the rotor area which is swept, it was assumed that it was possible to forego that very small area (inner region area) which only corresponds to about 5% of the total area, or to slightly enlarge the rotor diameter in order thereby to compensate for the area flow.

In that respect however the point was overlooked or not noted that this results in the formation of an aerodynamic hole in the near region of the wind power installation with rotor blades as shown in FIG. 2. In the near region the wind can flow unimpededly through that hole without experiencing any resistance. The result of this is that no laminar flow is built up in the inner region (first region of the rotor of the wind power installation) of the beginning profile at the rotor blade. That also means that the first region of the rotor blade with an (active) rotor profiling cannot contribute to energy generation.

Enercon already developed at a very early date (about 1990) thick, cut-off profiles in order to get around the above-indicated problems.

FIG. 3 shows such a profile which was used in the inner region of the rotor blade. In the case of large wind power installations (rotor diameters of over 70 m) however even the cut-off profiles result in blade depths of up to 6 m, which makes transportation of such rotor blades extremely difficult and makes the manufacture thereof extraordinarily complicated and expensive.

SUMMARY OF THE INVENTION

The object of the invention is to eliminate the above-indicated problems and to simplify the manufacture of a wind power installation and the operation thereof.

The invention attains that object with the features of a wind power installation as set forth herein. Advantageous developments are set forth in the appendant claims.

The concept of the wind power installation in accordance with the invention involves providing the wind power installation with two rotors of which the first, the small rotor, is arranged in front of the second, the larger rotor. Accordingly it is proposed in accordance with the invention that the inner region of the rotor of a wind power installation is completely separated from the outer region.

In accordance with aspects of the present invention, the nominal rotary speed of the first rotor may be approximately in the range of between 25 and 45 rpm. In accordance with other aspects of the present invention, the nominal rotary speed of the second rotor may be approximately in the range of between 5 and 19 rpm. According to still other aspects of the present invention, the first rotor may be of a diameter of between about 35 and 55 m and the second rotor may be of a diameter of between about 100 and 150 m, preferably about 113 m.

FIG. 4A shows a front elevational view of the first and second rotors in accordance with aspects of the illustrated embodiments. FIG. 4B shows a side elevational view of the first and second rotors illustrating the first smaller rotor arranged in front of the second larger rotor in accordance with aspects of the illustrated embodiments.

According to further aspects of the present invention, the second rotor may be of a markedly larger diameter than the first rotor and may be arranged behind the first rotor; the second rotor may have rotor blades whose active blade areas begin only in the region of the rotor blade tips of the first rotor. According to still further aspects of the present invention, the first rotor blade portion of the second rotor may be fixed rigidly to the hub of the second rotor.

DETAILED DESCRIPTION OF THE INVENTION

Figure 1:
FIGS. 1 and 2 show prior art rotor blades, respectively.
Figure 2:
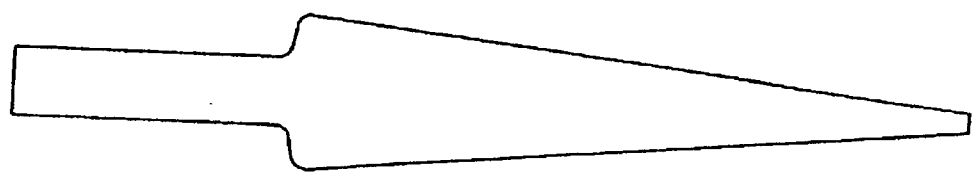
Figure 3:
FIG. 3 shows a profile used in an inner region of a prior art rotor blade.
Figure 4A:
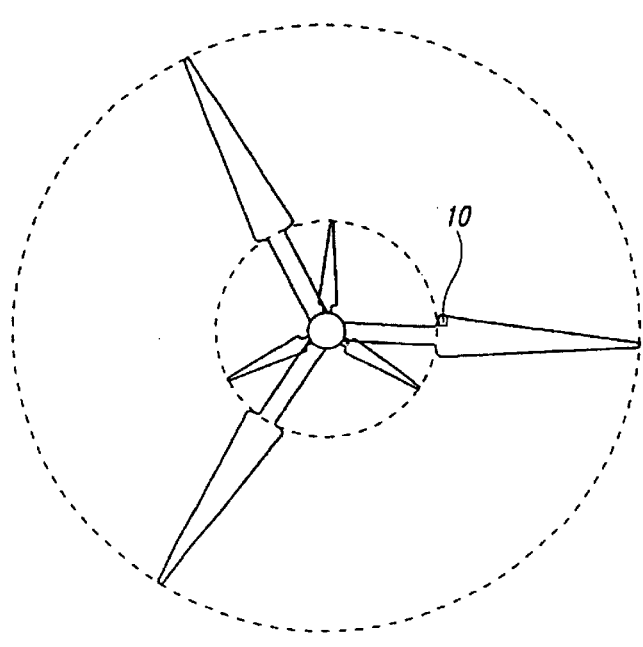
FIG. 4A shows a schematic representation of the rotor blades according to one embodiment of the invention.
Figure 4B:
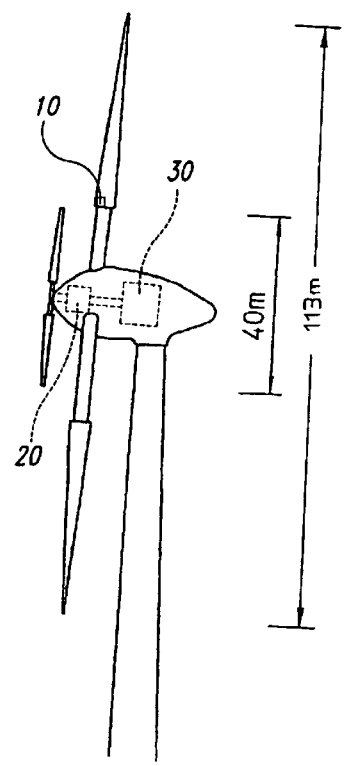
FIG. 4B shows a side view of a wind power installation according to one embodiment of the invention.

Such a wind power installation is described by way of example with reference to FIGS. 4A and 4B. In this respect the model adopted for the description is a large-scale wind power installation involving a diameter of about 113m and an installed generator output of about 5 MW. The rotor for the inner region is in this case of about 40m in diameter.

Accordingly, for the second rotor, the larger rotor, there still remains an active rotor blade length of about 36.5 m. The first small rotor rotates at a nominal speed of about 38 rpm. The second large rotor rotates at a nominal speed of 11 rpm. That means that the peripheral speeds of the rotor blade tips of the two rotors are almost the same.

The advantage of the wind power installation according to the invention is that only a very small engagement surface presents itself in relation to high wind speeds, for the inner region of the rotor. Accordingly the extreme loadings on the entire wind power installation are very much lower.

A further advantage is that the rotor blade for the outer region (the second rotor) can be produced as a unit of a length of about 36.5 m. Such a rotor blade can be fitted onto a rotor blade stump which aerodynamically no longer provides any relevant contribution to driving the rotor. That means that transportation of the rotor blades is readily possible.

A further advantage is also that the rotor blade adjusting device 10 of the second rotor no longer has to be so large in design as the rotor blade adjusting device can be fitted (mounted) on the rotor blade stump and accordingly is about 20 m (radius of the small rotor) away from the hub.

In operation of the wind power installation each rotor drives its own generator, 20, 30. The generator 30 of the first rotor is disposed between the first and second rotors and is preferably driven directly by it. In regard to the design structure of the wind power installation according to the invention, this means that a rotor-generator arrangement of relatively small type, for example of type E-40 from Enercon, is placed in front of the second rotor. In that case both rotors and both generators are carried by a single trunnion and are mounted rotatably thereon.

Preferably both rotors rotate in the same direction (clockwise), but it is also possible if the rotor blades are of a suitable design configuration for the rotors to be caused to rotate in opposite directions.

The pylon of the wind power installation according to the invention is more than 100 m in height, for example the hub height is in the region of between 120 and 160 m.

In operation of the wind power installation the smaller rotor (the first rotor) provides that no aerodynamic hole can be formed in the inner region of the second rotor.

What is claimed is:

1. A wind power installation comprising:
   at least two rotors which are arranged one behind the other and of which the first rotor which is arranged in front of the second rotor is of a smaller diameter than the second rotor wherein the peripheral speed of rotor blade tips of both rotors is approximately equal in nominal operation.

2. A wind power installation as set forth in claim 1 characterised in that the first rotor rotates at a higher rotary speed than the second rotor.

3. A wind power installation as set forth in claim 1 characterised in that the nominal rotary speed of the first rotor is approximately in the range of between 25 and 45 rpm.

4. A wind power installation as set forth in claim 1 characterised in that the nominal rotary speed of the second rotor is approximately in the range of between 5 and 19 rpm.

5. A wind power installation as set forth in claim 1 characterised in that a respective generator is associated with each rotor.

6. A wind power installation as set forth in claim 1 characterised in that the first rotor is of a diameter of between about 35 and 55 m and the second rotor is of a diameter of between about 100 and 150 m, preferably about 113 m.

7. A wind power installation comprising:
   a first and a second rotor, wherein the second rotor is of a markedly larger diameter than the first rotor and is arranged behind the first rotor and the second rotor has rotor blades whose active blade areas begin only in the region of rotor blade tips of the first rotor wherein the peripheral speed of the rotor blade tips of both rotors is approximately equal in nominal operation.

8. A wind power installation as set forth in claim 7 characterised in that the rotor blades of the second rotor comprise two portions, wherein the second outer portion of a rotor blade forms the active rotor blade and the first portion of a rotor blade is aerodynamically formed such that it makes no relevant contribution to driving the second rotor.

9. A wind power installation as set forth in claim 8 characterised in that a rotor blade adjusting device is provided for a rotor blade of the second rotor, said rotor blade adjusting device being between the first and second rotor blade portions.

10. A wind power installation as set forth in claim 8 characterised in that the first rotor blade portion of the second rotor is fixed rigidly to a hub of the second rotor.

11. A wind power installation comprising;
    a rotor arrangement having an inner and an outer region, a first rotor in the inner region and a second rotor in the outer region,
    wherein the first rotor is separated from the second rotor, wherein the peripheral speed of rotor blade tips of the first rotor and of the second rotor are approximately equal in nominal operation.

12. A wind power installation as set forth in claim 11 characterised in that arranged between the first rotor and the second rotor is a first generator whose generator rotor is connected to the first rotor and is driven thereby.

13. A wind power installation as set forth in claim 11 characterised in that the first rotor is arranged so closely in front of the second rotor that no aerodynamic hole can be formed in the inner region of the second rotor.

14. A wind power installation as set forth in claim 11 characterised in that the first and second rotors of the wind power installation rotate in the same direction.

15. A wind power installation comprising:
    at least two rotors which are arranged one behind the other and of which the first rotor which is arranged in front of the second rotor is of a smaller diameter than the second rotor characterised in that the nominal speed of rotation of the first rotor is markedly higher than the nominal speed of rotation of the second rotor and the peripheral speed of the rotor blade tips of both rotors is approximately equal in nominal operation.

* * * * *

UNITED STATES PATENT AND TRADEMARK OFFICE
CERTIFICATE OF CORRECTION

PATENT NO.         : 7,074,011 B1                                          Page 1 of 1
APPLICATION NO.    : 10/182281
DATED              : July 11, 2006
INVENTOR(S)        : Aloys Wobben It is certified that error appears in the above-identified patent and that said Letters Patent is hereby corrected as shown below:

Column 3
Lines 51-53, "at least two rotors which are arranged one behind the other and of which the first rotor which is arranged in front of the second rotor" should read as -- at least two rotors which are arranged one behind the other wherein the first and second rotor are arranged on the same side of the wind power installation and of which the first rotor which is arranged in front of the second rotor --

Column 4
Lines 13-15, "a first and a second rotor, wherein the second rotor is of a markedly larger diameter than the first rotor and is arranged behind the first rotor and the second rotor" should read as -- a first and a second rotor, wherein the second rotor is of a markedly larger diameter than the first rotor and is arranged behind the first rotor wherein the first and second rotor are arranged on the same side of the wind power installation and the second rotor --

Lines 41-42, "first rotor and of the second rotor are approximately equal in nominal operation." should read as -- first rotor and of the second rotor are approximately equal in nominal operation where in the first and second rotor are arranged on the same side of the wind power installation. --

Lines 55-56, "at least two rotors which are arranged one behind the other and of which the first rotor is arranged in front" should read as -- at least two rotors which are arranged one behind the other wherein the first and second rotor are arranged on the same side of the wind power installation and of which the first rotor which is arranged in front --

Signed and Sealed this

Fifteenth Day of July, 2008

JON W. DUDAS
*Director of the United States Patent and Trademark Office*